Aug. 10, 1937.      M. P. KENNEY      2,089,850
AUTOMOBILE HOOD LIGHT
Filed March 3, 1936      2 Sheets-Sheet 1

INVENTOR.
Marcus P. Kenney
BY Leo N. Dourke
ATTORNEY.

Aug. 10, 1937.  M. P. KENNEY  2,089,850

AUTOMOBILE HOOD LIGHT

Filed March 3, 1936  2 Sheets-Sheet 2

INVENTOR.
Marcus P. Kenney
BY
ATTORNEY.

Patented Aug. 10, 1937

2,089,850

UNITED STATES PATENT OFFICE 2,089,850

AUTOMOBILE HOOD LIGHT

Marcus P. Kenney, Cincinnati, Ohio

Application March 3, 1936, Serial No. 66,877

7 Claims. (Cl. 240—7.1)

The invention relates to a light particularly adapted to illuminate the space, including the motor and other mechanism, beneath the hood of an automobile.

Heretofore, considerable difficulty and inconvenience has been experienced by automobile owners, mechanics, and others, who desire to inspect, make adjustments and repairs of the mechanism beneath the hood of an automobile at nighttime or in other locations where the mechanism is insufficiently illuminated to enable the person, desiring to make the inspections, adjustments or repairs, to plainly see in order that he may perform his work quickly and efficiently. Under these circumstances it is necessary that a usual drop or repair light shall be utilized and if none is available, as when such inspection, adjustments or repairs are required to be made on a street or highway at nighttime, said person is compelled to work at great inconvenience and under difficulties.

Therefore, an important object of the invention is to provide simple, efficient and practical means adapted to automatically illuminate the space, engine and mechanism under the hood of an automobile, when either side of said hood is raised or elevated for the purpose of enabling any person to inspect, adjust or repair the engine and mechanism under said hood.

Other objects of the invention are to provide simple, durable and dependable means adapted, when said hood is manually closed, to automatically break the electrical circuit, which is intended to illuminate an electric lamp utilized to illuminate said space, engine and mechanism under said hood; to provide a simple and practical shade for said lamp; and to provide a simple and durable support for said lamp, shade and co-operating mechanism.

Other objects of the invention will be apparent by reference to the hereinafter description and explanations.

The invention consists in the arrangement, combination and association of the elements hereinafter explained.

Figure 1:
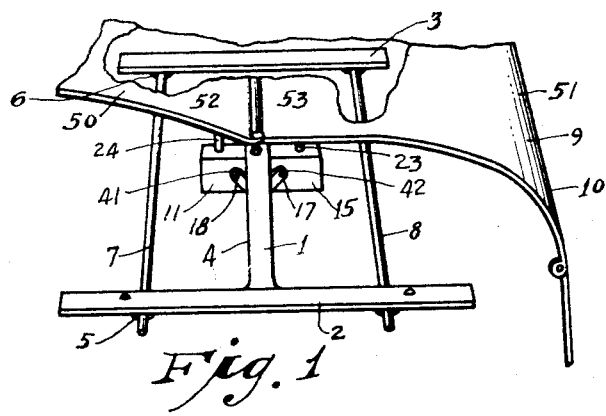
Fig. 1 is a perspective view of an automobile hood, showing parts broken away, showing one side of the hood partly open, and with parts removed.
Figure 2:
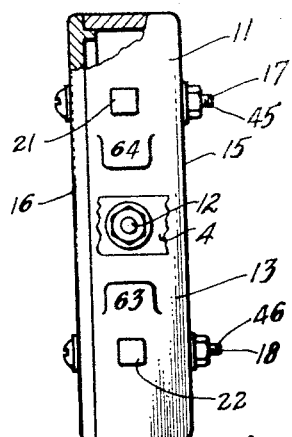
Fig. 2 is an end elevational view of the container, and showing parts broken away.
Figure 3:
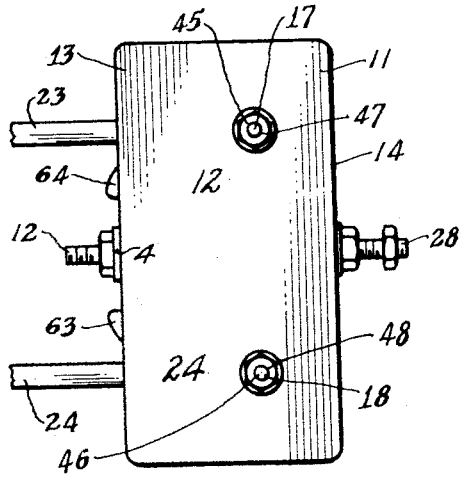
Fig. 3 is a front elevational view of the container.
Figure 4:
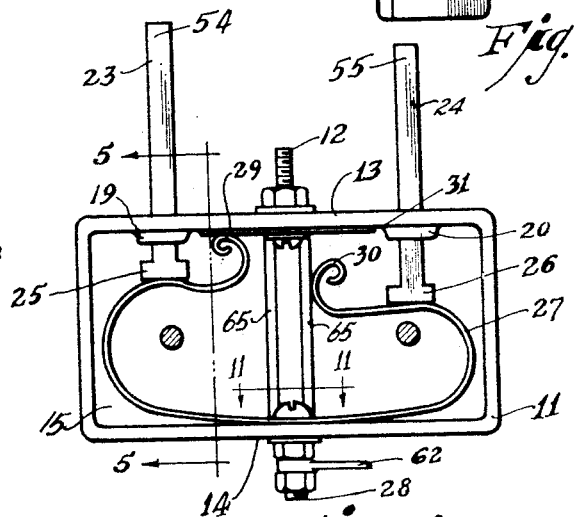
Fig. 4 is a rear elevational view of the container with the side removed.
Figure 5:
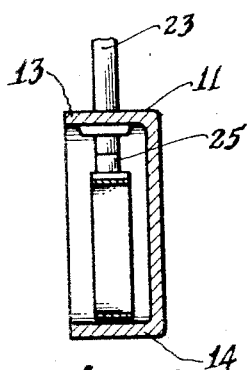
Fig. 5 is a section taken on line 5—5 in Fig. 4.
Figure 6:
Fig. 6 is a perspective view of a plunger.
Figure 7:
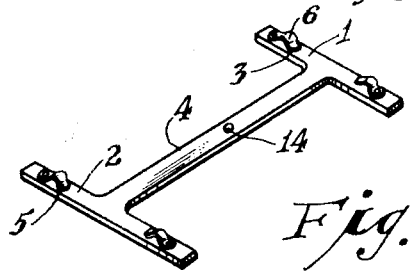
Fig. 7 is a perspective view of the hanger.

In the preferred construction of the invention, I provide the hanger or support 1 comprising the end rods 2 and 3 integrally connected with the cross arm or rod 4. Fixed to the end rods 2 and 3, respectively, are the upwardly curved spring connectors 5 and 6 adapted to receive the stay rods 7 and 8 beneath the hood 9 of the automobile 10, as shown in Fig. 1, whereby the hanger 1 is supported in fixed position beneath the hood and in spaced apart relation therefrom.

Fixed to the lower side of the cross arm 4 is the longitudinal casing, box or container 11, as by bolt 12 received in a hole in the top 13 of the container. The bolt is received through the hole 14 in the cross arm 4.

The container is formed from non-conductive electric current material and comprises the integrally formed top 13, bottom 14 and front side 15. The rear side 16 is secured in fixed position as by the bolts 17 and 18 which extend through the sides 15 and 16.

Integral with the top 13 are the bosses 19 and 20 having the holes 21 therethrough which slidably receive the vertical plungers 23 and 24 formed from non-conductive electric current material. The heads 25 and 26 are integrally connected with the lower ends of the plungers and may contact the bosses 19 and 20 when the plungers are in uppermost positions. Beneath the plunger heads 25 and 26 is the C-shape or curved spring 27 having its bottom or lower side fixed to the bottom 14 of the container 11, as by the bolt 28. The upper ends 29 and 30 of the spring 27 normally remain in contact with the heads 25 and 26 of the plungers.

Fixed beneath the lower side of the top 13, of the container 11, is the plate 31 formed from electric current conductive material. The plate is received between the head of the bolt 12, which passes through it, and the lower surface of the top 13 of the container.

The bolt 12, spring 27, hanger 1, and plate 31 are formed from electric current conductive material.

When the plungers 23 and 24 are in uppermost positions, the upper ends 29 and 30 of the spring 27 contact the bottom of the plate 31.

Figure 8:
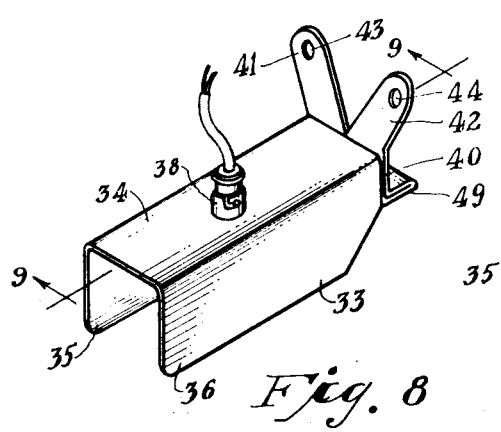
Fig. 8 is a perspective view of the lamp brackets.
Figure 12:
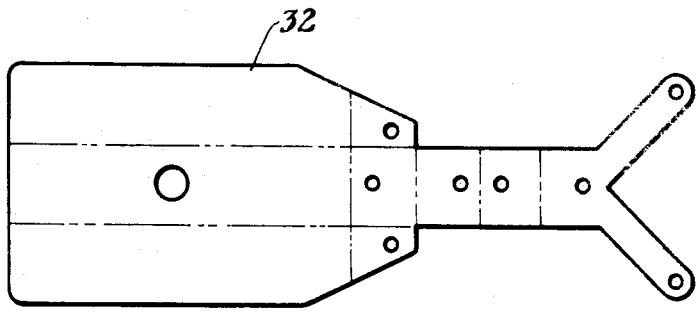
Fig. 12 is a plan elevational view of a stamping.

The metal electric current conductive lamp bracket stamping 32, shown in Fig. 12, is formed by a usual stamping process. Afterward it is bent to the form shown in Fig. 8 and comprises the bracket or reflector 33 having the top and sides 34, 35 and 36. In the top 34 is the hole 37 in which is suitably fixed the electric lamp socket 38 adapted to receive the usual electric lamp or globe 39 positioned between the sides 35 and 36 and beneath the top 34.

Figure 9:
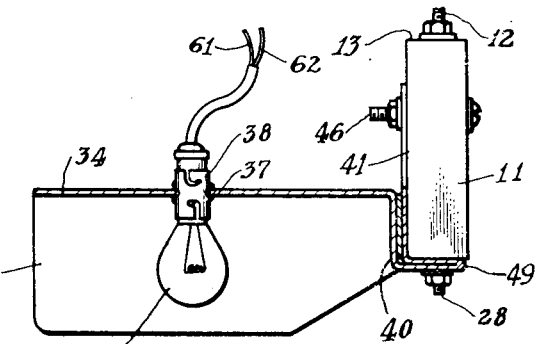
Fig. 9 is a section taken on line 9—9 in Fig. 8, and showing the bracket attached to the container.
Figure 10:
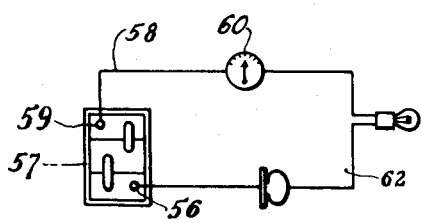
Fig. 10 is a diagram of the electrical connections.
Figure 11:
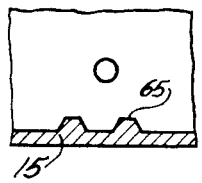
Fig. 11 is a section taken on line 11—11 in Fig. 4.

Integral with the end 40 of the bracket 33 is the upwardly extending fingers 41 and 42 having the holes 43 and 44 therein in which is received the ends 45 and 46 of the bolts 17 and 18. The nuts 47 and 48 are screwed in close engagement with the fingers 41 and 42 whereby the bracket 33 is retained in contact with and in fixed position with respect to the container 11, as shown in Figs. 1 and 9, and with the bend 49 in contact with the bottom 14 of the container.

As shown in Fig. 1 the container 11 is fixed beneath the arm 4 and extends transversely of the hood 9 of the automobile 10. The plungers 23 and 24 respectively, are positioned beneath the sides 50 and 51 of the hood. The sides 50 and 51 of the hood, as usual, have their inner edges 52 and 53 hingedly connected with each other and are adapted to be manually raised to open positions. When the sides 50 and 51 of the hood are down and in closed positions the lower surfaces of the sides 50 and 51, respectively, contact the upper ends 54 and 55 of the plungers 23 and 24 thereby forcing the plungers downwardly and the heads 25 and 26, of the plungers, force the ends 29 and 30, of the spring 27, downwardly and out of contact with the plate 31, whereby the electric circuit is broken which comprises the plate 31; the bolt 12; the hanger 4; metal parts of the automobile 10, which as usual is connected with one terminal 56 of the usual electric storage battery 57; the conductor 58, connected with the terminal 59 and the ammeter 60; the conductor 61, connected with the lamp socket 38 and the ammeter 60; the conductor 62, connected with the lamp 39 and the bolt 28; and the spring 27.

If either side 50 or 51, or both of the sides, of the hood 9, are manually raised or opened the end of the respective plunger 23 or 24 beneath the raised side is permitted to move upwardly and the respective end of the spring 23 or 24 contacts the lower side of the plate 31 thereby completing or closing the above mentioned electric circuit, whereby the electric lamp 39 is illuminated and the light rays therefrom are reflected downwardly by the top 34 of the bracket 33.

Therefore, manually raising either, or both sides 50 or 51 of the hood 9, of the automobile 10, causes the lamp 39 to automatically be illuminated, and manually closing both sides 50 and 51, of the hood, automatically extinguishes the lamp 39.

For the purpose of retaining the container 11 in predetermined position with respect to the arm 4, of the hanger 1, the projections 63 and 64 are formed integral with the top 13 and the arm 4 is received therebetween. The inwardly projecting ribs 65, integral with the front 15, of the container 11, limits the downward movement of the ends 29 and 30 of the spring 27.

An advantage of the invention is that when any person desires to inspect, adjust or repair any of the mechanism, or engine, under the hood of the automobile 10, he simply opens or raises the side of the hood under which is positioned the part of the engine, parts or mechanism that he desires to inspect, adjust or repair, and the part of the engine or the mechanism beneath the side of the raised hood is immediately and automatically illuminated. After he has completed the inspection, adjustments or repairs he simply lowers and closes the side of the raised hood, and the electrical circuit utilized to illuminate the lamp bulb, beneath the side of the hood manually closed, is automatically broken, or disconnected, whereby the lamp 39 is no longer illuminated.

Another advantage of the invention is that the mechanism utilized to automatically close and break the electrical circuit, utilized to illuminate the electric lamp bulb 39 is durable and unlikely to require frequent adjustments or replacement of parts.

Still another advantage is that the invention may be quickly and conveniently attached to any automobile beneath the hood, and it is unlikely to rattle or vibrate during the operation of the engine or while the automobile is traveling. Obviously, any suitable hanger, for supporting the container 11, may be utilized.

It is, therefore, quite apparent that I have invented a highly desirable and practical device for the intended purposes, and which may be utilized at any time at small expense for operation at great convenience to the user.

While I believe that the form of the invention illustrated in the drawings and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. The combination with a motor vehicle having a hood capable of being manually raised and opened at two sides, of an electric battery, electric current conducting means connecting one terminal of said battery with a metal part of said motor vehicle, a support formed from electric current conducting material and being fastened to said motor vehicle beneath said hood, a longitudinal casing formed from electric current conducting material and being fixed to said support and extending transversely of said hood, a plate formed from electric current conducting material and fixed inside said casing and to the top thereof, an electric current conductor connecting the other terminal of said battery with said plate, a plunger protruding from each end of the top of said casing and slidably mounted therein, a curved spring inside said casing and being fixed thereto and having its ends curved upwardly and in contact with the lower ends of said plungers and said ends being normally in contact with said plate, an electric bulb bracket formed from electric current conducting material and being fixed to said casing, an electric bulb fastened in contact with said bracket, the upper ends of said plungers adapted to be contacted and forced downwardly by said sides of said hood when said hood is in closed position, whereby said ends of said spring are removed from contact with said plate and the electric circuit for illuminating said bulbs is broken comprising said battery and conductors connecting its terminals with said plate and said motor vehicle, said plate and said bracket, and when said sides of said hood are raised from contact with said plungers said ends of said springs contact said plate and complete said electric circuit and illuminate said bulbs.

2. The combination with a motor vehicle having a hood capable of being manually raised and opened at two sides, of an electric battery, electric current conducting means connecting one terminal of said battery with a metal part of said motor vehicle, a support formed from electric current conducting material and being fastened to said motor vehicle beneath said hood, a casing formed from electric current conducting material and being fixed to said support, a plate formed from electric current conducting material and fixed inside said casing and to the top thereof, an electric current conductor connecting the other terminal of said battery with said plate, a plunger protruding from each end of the top of said casing and slidably mounted therein, a spring inside said casing and being fixed thereto and having its ends in contact with the lower ends of said plungers and said ends being normally in contact with said plate, an electric bulb bracket formed from electric current conducting material and being fixed to said casing, an electric bulb fastened in contact with said bracket, the upper ends of said plungers adapted to be contacted and forced downwardly by said sides of said hood when said hood is in closed positions, whereby said ends of said spring are removed from contact with said plate and the electric circuit for illuminating said bulbs is broken comprising said battery and conductors connecting its terminals with said plate and said motor vehicle, said plate and said bracket.

3. The combination with an automobile having a hood capable of being opened on two sides, of a support formed from electric current conducting material and being fastened to said automobile beneath said hood, a casing fixed to said support and extending transversely of said hood, an electric current conducting plate fixed inside said casing and to the top thereof, a plunger protruding from each end of the top of said casing and slidably mounted therein, a curved spring fixed inside said casing and having its ends curved upwardly and in contact with the lower ends of said plungers, and normally in contact with said plate, an electric bulb bracket formed from electric current conducting material, means to fasten said bracket to said casing, and an electric circuit comprising said plate, said support and the metal of said automobile, said plungers being positioned adjacent the inner sides of said hood and when said hood is closed said sides force said plungers inwardly and remove said ends of said spring from contact with said plate.

4. The combination with an automobile having a hood capable of being opened on two sides, of a support formed from electric current conducting material and being fastened to said automobile beneath said hood, a casing fixed to said support, an electric current conducting plate fixed inside said casing and to the top thereof, a plunger protruding from each end of the top of said casing and slidably mounted therein, a spring fixed inside said casing and having its ends in contact with the lower ends of said plungers, and normally in contact with said plate, an electric bulb bracket formed from electric current conducting material, means to fasten said bracket to said casing, and an electric circuit comprising said plate, said support and the metal of said automobile, said plungers being positioned adjacent the inner sides of said hood and when said hood is closed said sides force said plungers inwardly and remove said ends of said spring from contact with said plate.

5. The combination with a motor vehicle having a hood capable of being manually raised and opened at two sides, of a source of electric supply, a conductor connecting said supply with a metal part of said automobile, a support adapted to conduct electric current and comprising end rods integrally connected with a cross arm, means to space said support from said hood, means to fix said support to said automobile beneath said hood, a casing fixed to said support and being formed from electric current conducting material, a plate formed from electric current conducting material and fixed inside said casing and to the top thereof, an electric current conductor connecting said supply with said plate, means protruding from the top of said casing and slidably mounted therein, a C-shape spring inside said casing and being fixed thereto and having its ends normally in contact with the lower ends of said last mentioned means and said ends being normally in contact with said plate, an electric bulb bracket formed from electric current conducting material and being fixed to said casing, an electric bulb fastened in contact with said bracket, the upper ends of said last mentioned means adapted to be contacted and forced downwardly by said sides of said hood when said hood is in closed position, whereby said ends of said spring are removed from contact with said plate and the electric circuit for illuminating said bulb is broken comprising said supply and conductors connecting its terminals with said plate and said motor vehicle, said plate and said bracket.

6. The combination with a motor vehicle having a hood capable of being manually raised and opened, of a source of electric supply, a conductor connecting said supply with a metal part of said automobile, a support adapted to conduct electric current, means to fix said support to said automobile beneath said hood, a casing fixed to said support and being formed from electric current conducting material, a plate formed from electric current conducting material and fixed inside said casing and to the top thereof, an electric current conductor connecting said supply with said plate, means protruding from said casing, a C-shape spring inside said casing and having its ends normally in contact with said last mentioned means and said ends being normally in contact with said plate, an electric bulb bracket formed from electric current conducting material and being fixed to said casing, an electric bulb fastened in contact with said bracket, said last mentioned means adapted to be contacted and forced downwardly by said hood when said hood is in closed position, whereby said ends of said spring are removed from contact with said plate and the electric circuit for illuminating said bulb is broken comprising said supply and conductors connecting its terminals with said plate and said motor vehicle, said plate and said bracket.

7. The combination with a motor vehicle having a hood capable of being manually raised and opened, of a source of electric supply, a conductor connecting said supply with a metal part of said automobile, a support comprising means to fix said support to said automobile beneath said hood, a casing fixed to said support, a plate fixed inside said casing and to the top thereof, an electric current conductor connecting said supply with said plate, means protruding from said casing, a spring inside said casing and having its ends normally in contact with said last mentioned means and said ends being normally in contact with said plate, an electric bulb bracket being fixed to said casing, an electric bulb, said last mentioned means adapted to be contacted and forced downwardly by said hood when said hood is in closed position, whereby said ends of said spring are removed from contact with said plate and the electric circuit for illuminating said bulb is broken comprising said supply and conductors connecting its terminals with said plate and said motor vehicle, said plate and said bracket.

MARCUS P. KENNEY.